(12) United States Patent
Uffelman

(10) Patent No.: US 9,903,429 B2
(45) Date of Patent: Feb. 27, 2018

(54) BRAKE WITH A REED SWITCH FOR INDICATING AN OPERATING CONDITION OF THE BRAKE

(71) Applicant: Warner Electric Technology LLC, Braintree, MA (US)

(72) Inventor: Bradley Lyn Uffelman, Caro, MI (US)

(73) Assignee: Warner Electric Technology LLC, Braintree, MA (US)

( * ) Notice: Subject to any disclaimer, the term of this patent is extended or adjusted under 35 U.S.C. 154(b) by 0 days.

(21) Appl. No.: 14/620,355

(22) Filed: Feb. 12, 2015

(65) Prior Publication Data

US 2015/0152930 A1 Jun. 4, 2015

(51) Int. Cl.
| | |
|---|---|
| *F16D 55/02* | (2006.01) |
| *F16D 65/18* | (2006.01) |
| *F16D 66/02* | (2006.01) |
| *F16D 121/22* | (2012.01) |
| *F16D 66/00* | (2006.01) |

(52) U.S. Cl.
CPC .......... *F16D 65/18* (2013.01); *F16D 65/186* (2013.01); *F16D 66/025* (2013.01); *F16D 66/027* (2013.01); *F16D 66/028* (2013.01); *F16D 2066/003* (2013.01); *F16D 2121/22* (2013.01)

(58) Field of Classification Search
CPC ............. F16D 2121/18; F16D 2121/20; F16D 2121/22; F16D 65/18; F16D 66/00; F16D 66/003; F16D 66/005; F16D 27/06; F16D 59/02; F16D 2055/0058; F16D 55/28; F16D 2129/065
USPC ............ 188/1.11 E, 161, 163, 164, 171, 173
IPC .............................................. F16D 27/06,59/02
See application file for complete search history.

(56) References Cited

U.S. PATENT DOCUMENTS

| | | | | |
|---|---|---|---|---|
| 3,569,880 | A | * | 3/1971 | Wahlgren ......... G01R 19/16509 335/154 |
| 3,702,910 | A | * | 11/1972 | Akeley .................. H01H 36/02 200/84 B |
| 3,741,353 | A | | 6/1973 | McKinley et al. |
| 4,004,258 | A | | 1/1977 | Arnold |
| 4,620,173 | A | | 10/1986 | O'Brien |

(Continued)

FOREIGN PATENT DOCUMENTS

| | | | | |
|---|---|---|---|---|
| DE | | 3906069 A1 * | 8/1990 | ............. F16D 55/02 |
| DE | 10 2006 009 876 B3 | | 10/2007 | |

(Continued)

OTHER PUBLICATIONS

Translation of Baba et al (JP 2010242785 A1).*

(Continued)

*Primary Examiner* — Bradley T King
*Assistant Examiner* — Stephen M Bowes
(74) *Attorney, Agent, or Firm* — Reising Ethington P.C.

(57) ABSTRACT

A brake is provided that employs an electromagnetic or magnetic circuit to disengage the brake and in which a reed switch is used to indicate an operating condition of the brake. The reed switch is positioned across an air gap between two members of the electromagnetic or magnetic circuit. The reed switch is oriented such that a longitudinal axis of the reed switch extends in a direction other than parallel to one or both of (i) the axis of rotation for rotating components of the brake and (ii) a direction of a magnetic force at a point in the air gap where the magnetic force is greatest.

19 Claims, 2 Drawing Sheets

(56) References Cited

U.S. PATENT DOCUMENTS

| | | | | |
|---|---|---|---|---|
| 4,757,300 A | * | 7/1988 | Sebalos | B60Q 1/441 |
| | | | | 116/204 |
| 5,185,542 A | | 2/1993 | Lazorchak | |
| 5,717,174 A | * | 2/1998 | Ramos | B66B 1/32 |
| | | | | 187/288 |
| 6,545,852 B1 | | 4/2003 | Arnold | |
| 8,151,950 B2 | * | 4/2012 | Fargo | B66D 5/14 |
| | | | | 187/359 |
| 8,172,048 B2 | | 5/2012 | Jonsson | |

FOREIGN PATENT DOCUMENTS

| | | |
|---|---|---|
| DE | 20 2011 102 030 U1 | 11/2011 |
| JP | 2010-0242785 A | 10/2010 |

OTHER PUBLICATIONS

English language abstract of Japanese Publication No. 2010-0242785, Thomson Reuters (2014).

International Search Report issued in corresponding international application PCT/US2016/017441 dated (May 20, 2016).

Written Opinion issued in corresponding international application PCT/US2016/017441 dated (May 20, 2016).

\* cited by examiner

BRAKE WITH A REED SWITCH FOR INDICATING AN OPERATING CONDITION OF THE BRAKE

BACKGROUND OF THE INVENTION a. Field of the Invention

This disclosure relates to a brake. In particular, the instant disclosure relates to a brake that employs an electromagnetic or magnetic circuit to disengage the brake and in which a reed switch is oriented in a particular manner adjacent an air gap in the circuit to indicate an operating condition of the brake.

b. Background Art

One conventional type of brake used in industrial applications includes a friction plate or disc that is coupled to a rotating member. Springs bias a non-rotating armature plate into engagement with the friction plate in order to engage the brake. A conductor and/or magnets are then used to create an electromagnetic or magnetic circuit to draw the armature plate away from the friction plate when it is desired to disengage the brake.

The above-described brakes work well for their intended purpose. Occasionally, however, the brake will fail to disengage as intended despite the creation of the electromagnetic or magnetic circuit due to, for example, wear on components of the brake (which may increase the distance between the armature plate and other components forming the electromagnetic or magnetic circuit) or the presence of foreign objects that prevent movement of the armature plate. In many applications, particularly where the brake is not visible or in highly automated systems, the failure of the brake to disengage is not readily apparent to a user and/or the system in which the brake is installed. As a result, an undesirable expenditure of resources (e.g., employee time and/or system downtime) is required to diagnose the problem in a particular application resulting from the malfunctioning brake.

The inventor herein has recognized a need for a brake that will minimize and/or eliminate one or more of the above-identified deficiencies.

BRIEF SUMMARY OF THE INVENTION

A brake is provided. In particular, a brake is provided that employs an electromagnetic or magnetic circuit to disengage the brake and in which a reed switch is oriented in a particular manner adjacent an air gap in the circuit to indicate an operating condition of the brake.

A brake in accordance with one embodiment of the invention includes a friction plate configured for coupling to a shaft for rotation with the shaft about an axis of rotation. The brake further includes a pressure plate disposed about the axis on a first side of the friction plate and fixed against rotation and an armature plate disposed about the axis on a second side of the friction plate. The brake further includes a field shell disposed about the axis on an opposite side of the armature plate relative to the friction plate. The brake further includes a spring biasing the armature plate in a first axial direction towards the friction plate and away from the field shell to engage the brake. The brake further includes a conductor disposed within the field shell. Current supplied to the conductor creates an electromagnetic circuit including the armature plate and the field shell. The electromagnetic circuit urges the armature plate in a second axial direction away from the friction plate and towards the field shell to disengage the brake. The brake further includes a reed switch extending across an air gap between first and second members of the electromagnetic circuit. A state of the reed switch is indicative of an operating condition of the brake. A longitudinal axis of the reed switch extends in a direction other than parallel to the axis of rotation.

A brake in accordance with another embodiment of the invention includes a friction plate configured for coupling to a shaft for rotation with the shaft about an axis of rotation. The brake further includes a pressure plate disposed about the axis on a first side of the friction plate and fixed against rotation and an armature plate disposed about the axis on a second side of the friction plate. The brake further includes a field shell disposed about the axis on an opposite side of the armature plate relative to the friction plate. The field shell includes first and second components. The brake further includes a spring biasing the armature plate in a first axial direction towards the friction plate and away from the field shell to engage the brake. The brake further includes a magnet disposed between the first and second components of the field shell and forming a magnetic circuit with the first and second components of the field shell and the armature plate. The magnetic circuit urges the armature plate in a second axial direction away from the friction plate and towards the field shell to disengage the brake. The brake further includes a reed switch extending across an air gap between first and second members of the magnetic circuit. A state of the reed switch is indicative of an operating condition of the brake. A longitudinal axis of the reed switch extends in a direction other than parallel to the axis of rotation.

A brake in accordance with another embodiment of the invention includes a friction plate configured for coupling to a shaft for rotation with the shaft about an axis of rotation. The brake further includes a pressure plate disposed about the axis on a first side of the friction plate and fixed against rotation. The brake further includes an armature plate disposed about the axis on a second side of the friction plate and a field shell disposed about the axis on an opposite side of the armature plate relative to the friction plate. The brake further includes a spring biasing the armature plate in a first axial direction towards the friction plate and away from the field shell to engage the brake. The brake further includes a conductor disposed within the field shell. Current supplied to the conductor creates an electromagnetic circuit including the armature plate and the field shell, the electromagnetic circuit urging the armature plate in a second axial direction away from the friction plate and towards the field shell to disengage the brake. The brake further includes a reed switch extending across an air gap between first and second members of the electromagnetic circuit, a state of the reed switch indicative of an operating condition of the brake.

A brake in accordance with the present teachings is advantageous relative to conventional brakes because it provides an effective, low cost indication of the operation of the brake. As a result, a user of the brake and/or the system in which the brake is installed is capable of readily identifying a malfunction of the brake without a significant expenditure of time.

The foregoing and other aspects, features, details, utilities, and advantages of the invention will be apparent from reading the following detailed description and claims, and

DETAILED DESCRIPTION OF THE INVENTION

Figure 1:
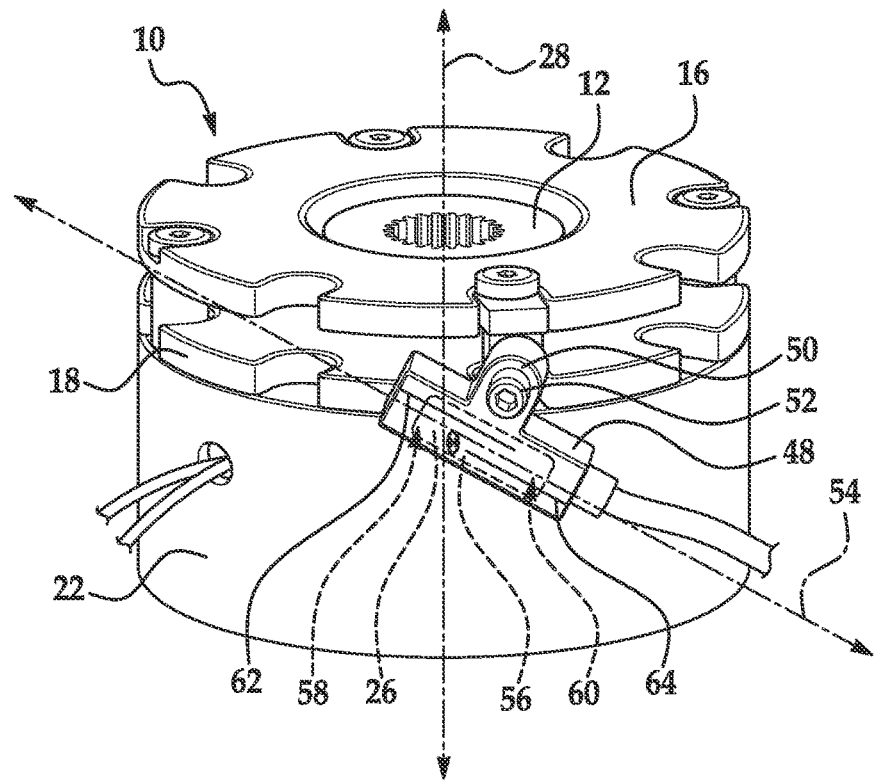
FIG. 1 is a perspective view of a brake in accordance with one embodiment of the present invention.
Figure 2:
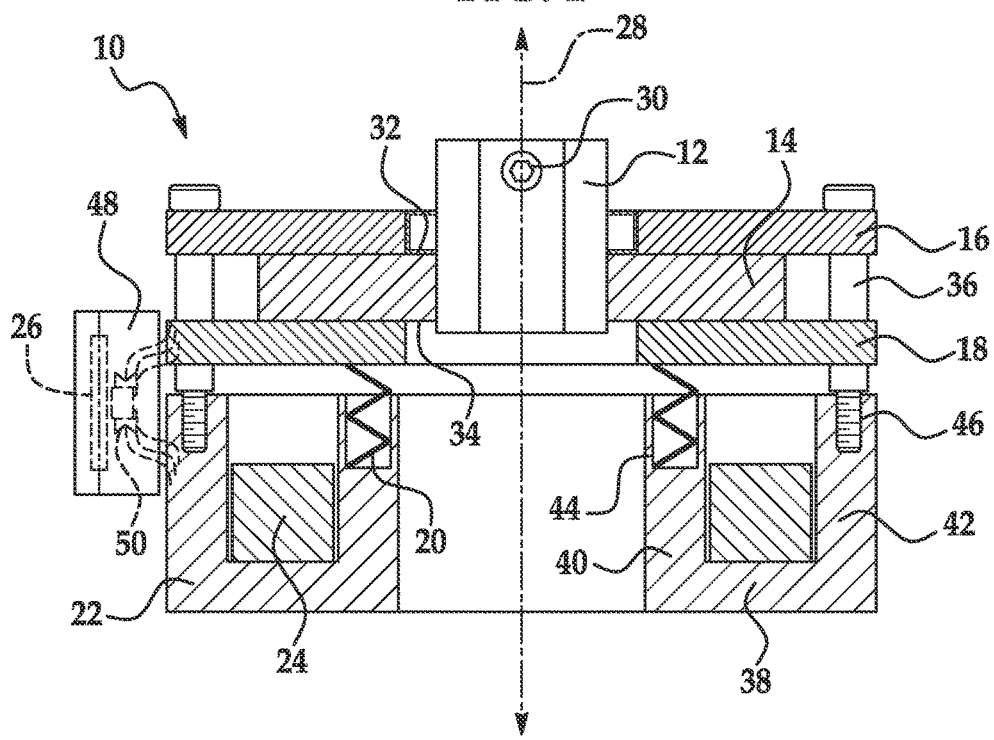
FIG. 2 is a cross-sectional view of the brake of FIG. 1.

Referring now to the drawings wherein like reference numerals are used to identify identical components in the various views, FIG. 1-2 illustrate brake 10 in accordance with one embodiment of the invention. Brake 10 provides a braking torque to a rotating body such as a shaft, gear, pulley, blade, etc. in order to slow or halt rotation of the rotating body. It will be understood by those of ordinary skill in the art that brake 10 may be used in a wide variety of industrial and other applications requiring a brake. Brake 10 may include a hub 12, a friction plate 14, a pressure plate 16, and armature plate 18, means, such as springs 20, for biasing armature plate 18 in one direction and means, such as field shell 22 and conductor 24, for urging armature plate 18 in another direction. In accordance with the present teachings, brake 10 may further include a reed switch 26 whose state is indicative of an operating condition of brake 10.

Hub 12 is configured for coupling to a rotating body such as a shaft (not shown) and supports friction plate 14. Hub 12 may be made from conventional plastics. Hub 12 is annular and is disposed about the rotating shaft and an axis 28 of rotation for the shaft. Hub 12 may be coupled to the shaft in a variety of ways. For example, hub 12 may define a key or keyway configured for alignment with a complementary keyway or key in the shaft. Hub 12 may alternatively include a plurality of splines or teeth configured to mesh with mating splines or teeth on the shaft. Alternatively still, a set screw 30 may be inserted through a radially extending aperture in hub 12 and engage the shaft. Hub 12 may also form a unitary structure with the shaft. The radially outer surface of hub 12 may define a plurality of flats for engagement with corresponding flats on friction plate 14.

Friction plate 14 is provided to transmit a braking torque to hub 12 and the shaft or other rotating body and is configured for coupling to the shaft (e.g. through hub 12) for rotation with the shaft about axis 28. Friction plate 14 may be made from conventional metals or plastics and may be made by stamping, molding and/or machining. Friction plate 14 may be annular in shape and disposed about hub 12 and axis 28. Friction plate 14 is configured for rotation with hub 12 and may be rotationally coupled to hub 12 in a variety of ways that permit axial movement of friction plate 14 relative to hub 12 to enable proper operation of brake 10 and account for wear, vibration, runout or thermal expansion. For example, the radially inner surface of friction plate 14 and the radially outer surface of hub 12 may have complementary, torque transmitting, shapes such as a key and keyway, splines, single or double D-shape or hexagonal shape. Friction plate 14 may also be coupled to hub 12 using leaf springs. In certain applications (typically low speed applications, applications with low to zero lash requirements and/or applications that permit light frictional drag during release of the brake), friction plate 14 may be combined with hub 12 as a unitary structure or coupled to hub 12 in a way that does not permit relative axial movement (e.g., an interference fit or through adhesives or other fasteners). Friction plate 14 includes friction surfaces on opposed sides 32, 34 configured to engage pressure plate 16 and armature plate 18, respectively, during engagement of brake 10.

Pressure plate 16 is configured to engage friction plate 14 during application of brake 10 to transmit a braking torque to friction plate 14. Pressure plate 16 provides a reaction surface against which armature plate 18 presses friction plate 14 during application of brake 10. Pressure plate 16 may be made from conventional metals or plastics and may be made from steel (including stainless steel) in some embodiments. Pressure plate 16 is disposed on side 32 of friction plate 14. Pressure plate 16 may further be disposed about hub 12 and axis 28. Pressure plate 16 is fixed against rotation and may be coupled to field shell 22 using a plurality of axially extending fasteners 36 such as bolts, pin, screws or the like.

Armature plate 18 is also configured to engage friction plate 14 during application of brake 10 to transmit a braking torque to friction plate 14. Armature plate 18 may be made from metals or metal alloys or other materials having relatively low magnetic reluctance such as iron or steel. Armature plate 18 is disposed on side 34 of friction plate 14. Armature plate 18 may further be disposed about hub 12 and axis 28. Armature plate 18 is fixed against rotation, but is axially movable towards and away from friction plate 14 and pressure plate 16 to permit engagement and disengagement of brake 10. Armature plate 18 may include a plurality of bores extending through armature plate 18 or a plurality of recesses in the radially outer surface of armature plate 18 configured to permit fasteners 36 to pass through armature plate 18. In this manner, fasteners 36 limit or prevent rotation of armature plate 18 about axis 28, but armature plate 18 is permitted to move along axis 28.

Springs 20 provide a means for biasing armature plate 18 in one direction along axis 28 towards friction plate 14 and pressure plate 16 to engage brake 10. Springs 20 may be disposed between field shell 22 and armature plate 18. It should be understood that brake 10 may include either a single annular spring 20 or a plurality of springs 20 disposed in an annular array about axis 28. In the latter case, springs 20 may be spaced equally circumferentially spaced about axis 28.

Field shell 22, together with conductor 24, provide a means for urging armature plate 18 in the opposite direction along axis 28 away from friction plate 14 and pressure plate 16 to disengage brake 10. Field shell 22 may also provide structural support and orient other components of brake 10 including pressure plate 16 and springs 20. Field shell 22 may be annular in shape and disposed about axis 28 and may be disposed on a side of armature plate 18 opposite friction plate 14. Field shell 22 may be made from materials having a relatively low magnetic reluctance such as ferromagnetic materials. Field shell 22 may define a radially extending end wall 38 and axially extending, radially aligned, inner and outer walls 40, 42 that extend axially from end wall 38 towards armature plate 18. Inner wall 40 may define one or more closed bores 44 configured to receive one end of each spring 20. Outer wall 42 may also define one or more closed bores 46 configured to receive fasteners 36. Conductor 24 may comprise a conventional wound coil or similar conductor and is configured to be received within field shell 22 between walls 40, 42. Current supplied to conductor 24 creates an electromagnetic circuit that includes armature plate 18 and field shell 22. This circuit urges armature plate 18 towards field shell 22 and away from friction plate 14 against the force of springs 20 to disengage brake 10.

In accordance with the present teachings, a reed switch 26 is provided that indicates an operating condition of brake 10. Switch 26 extends across an air gap between components of the electromagnetic circuit. In the illustrated embodiment, switch 26 is disposed radially outwardly of armature plate 18 and field shell 22 and extends across the air gap between armature plate 18 and field shell 22 (and particularly, outer wall 42 of field shell 22). In the illustrated embodiment, switch 26 detects flux leakage from the electromagnetic circuit between armature plate 18 and field shell 22 when current has been supplied to conductor 24, but armature plate 18 has failed to disengage from friction plate 14. This circumstance may occur, for example because wear on one or more of plates 14, 16, 18 has increased the distance between armature plate 18 and field shell 22 such that the electromagnetic circuit is no longer sufficient to attract armature plate 18 to field shell 22. Alternatively, a foreign object or element may become lodged between armature plate 18 and field shell 22 and prevent movement of armature plate 18 in the direction of field shell 22. In these circumstances, the distance between armature plate 18 and field shell 22 will result in flux leakage within the circuit and an increased magnetic field strength proximate switch 26 thereby causing switch 26 to assume a closed state and thereby providing an indication that the brake is not functioning properly. In all other circumstances (e.g., when current is not being supplied to conductor 24 or when current is being supplied to conductor 24, but armature plate 18 properly disengages from friction plate 14 and engages field shell 22 to minimize the air gap between armature plate 18 and field shell 22), switch 26 will remain in an open state.

Switch 26 may be mounted within a housing 48 that may be coupled to brake 10. In the illustrated embodiment housing 48 has a generally rectangular, box-like shape with a mounting flange 50 extending therefrom that is configured to receive a fastener 52 used to couple the housing 48 to brake 10. Housing 48 may be made from aluminum and helps to orient reed switch 26 relative to brake 10 and the air gap between armature plate 18 and field shell 22 (it should be understood, however, that switch 26 could be oriented relative to brake 10 using a variety of structures and/or coupling methods in place of housing 48). In accordance with the present teachings, switch 26 is oriented such that a longitudinal axis 54 of switch 26 extends in a direction other than parallel to axis 28. The longitudinal axis 54 of switch 26 is an axis that extends through and within a hermetically sealed glass chamber 56 of the switch 26 between the opposite longitudinal ends 58, 60 of chamber 56. The longitudinal ends 58, 60 of the chamber also define the points at which the ferromagnetic reeds 62, 64 of switch 26 enter the chamber 56. The longitudinal axis 54 of switch 26 will also intersect a plane containing axis 28 (the plane lying perpendicular to the drawing) at an angle θ between zero and ninety degrees. In accordance with one embodiment, axis 54 intersects the plane at an angle θ of about eighty degrees. The preferred angle in a given application will depend on several factors including the size of brake 10, available mounting envelope for switch 26, anticipated vibration, the number of turns in a coil conductor 24 and current level, the operating environment for brake 10 (including nearby electromagnetic or magnetic devices and ferromagnetic structures) and the brake's magnetic iron circuit relative to electromagnet flux imbalance. As a result of its orientation, axis 54 also extends in a direction other than parallel to a direction of magnetic force at a point in the air gap where the magnetic force is greatest. Referring to FIG. 2, the magnetic force between armature plate 18 and wall 42 of field shell 22 will be greatest along the shortest path between armature plate 18 and wall 42 which is parallel to axis 28.

Orienting switch 26 such that its longitudinal axis 54 is at an angle relative to the axis 28 enables more robust and reliable switching. In particular, the orientation reduces the sensitivity of switch 26 such that switch 26 only closes when there is a relatively high level of flux leakage proximate the air gap between armature plate 18 and field shell 22. As a result, switch 26 does not close when current is not supplied to conductor 24. Switch 26 also does not close when current is supplied to conductor 24 and armature plate 18 properly disengages from friction plate 14 and engages field shell 22—despite the existence of some flux leakage across the relatively small remaining air gap between armature plate 18 and field shell 22. Switch 26 only closes when current is supplied to conductor 24, but armature plate 18 improperly fails to disengage from friction plate 14—resulting in a relatively high level of flux leakage across the relatively large air gap between armature plate 18 and field shell 22. In this manner, switch 26 is able to indicate an improper operating condition of brake 10 while not generating false positives. The orientation of switch 26 also allows unwanted and inherent residual magnetism to drain from switch 26 to field shell 22 and other ferromagnetic components of the brake 10 when current is not being supplied to conductor 24 thereby preventing the contacts of switch 26 from inadvertently sticking and remaining closed. Further, the orientation of switch 26 accomplishes these results while allowing the switch 26 to be mounted close to the radially outer surface of field shell 22 and brake 10 in general thereby reducing the space required for switch 26 and the packaging of brake 10 while providing protection for switch 26.

Figure 3:
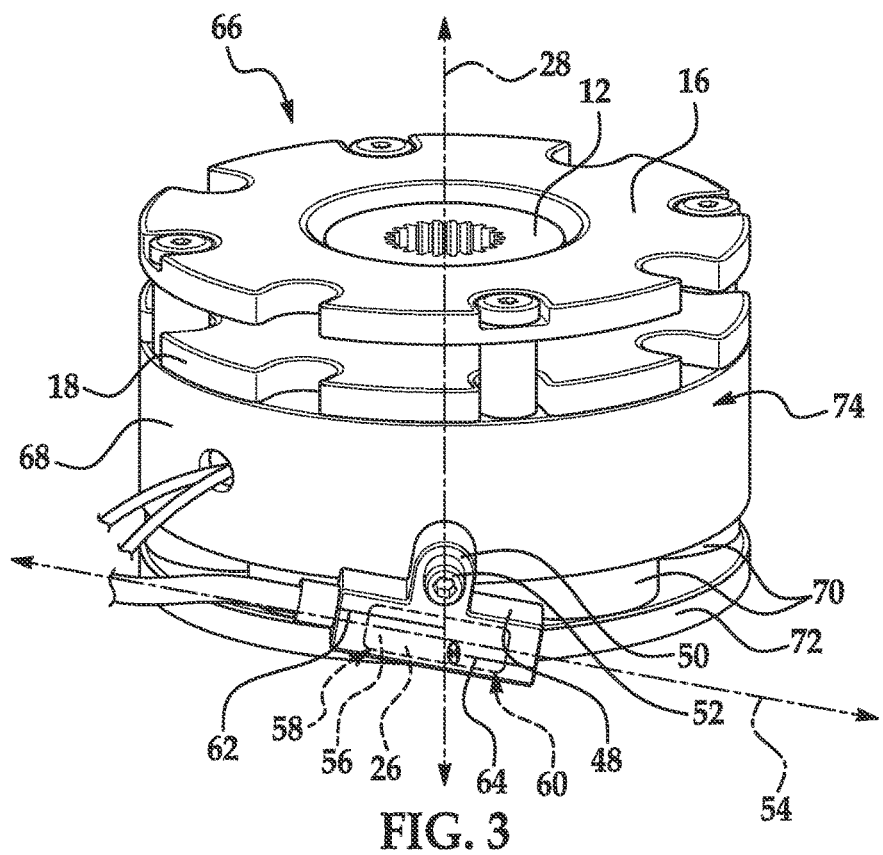
FIG. 3 is a perspective view of a brake in accordance with another embodiment of the present invention.
Figure 4:
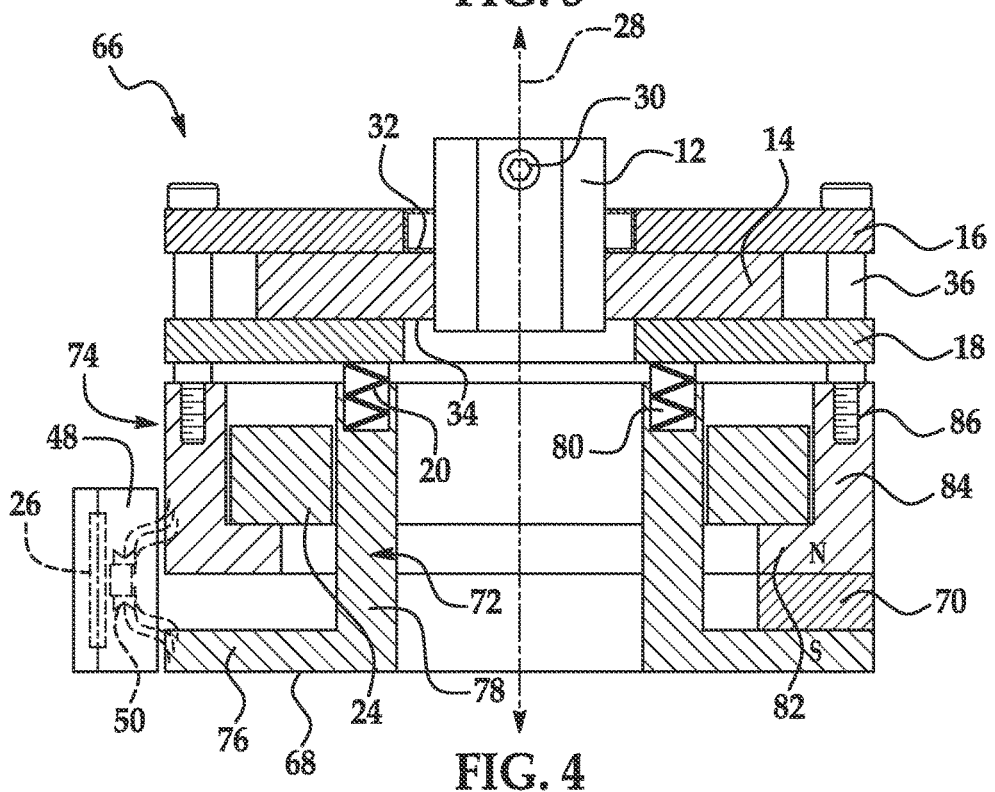
FIG. 4 is a cross-sectional view of the brake of FIG. 3.

Referring now to FIGS. 3-4, a brake 66 in accordance with another embodiment of the present teachings is illustrated. Many components of brake 10—including hub 12, friction plate 14, pressure plate 16 armature plate 18, springs 20 and conductor 24—may also be used within brake 66. Therefore, the same numbers are used in FIGS. 3-4 to represent structure that may be common to brakes 10 and 66. Brake 66 differs from brake 10 in the structure of the included field shell 68, the addition of one or more magnets 70, and the resulting operation of brake 66.

Field shell 68, together with magnets 70, provide a means for urging armature plate 18 in the opposite direction along axis 28 away from friction plate 14 and pressure plate 16 in order to disengage brake 66. Field shell 68 may also provide structural support and orient other components of brake 66 including pressure plate 16 and springs 20. Field shell 68 may be annular in shape and disposed about axis 28 and may be disposed on a side of armature plate 18 opposite friction plate. Field shell 68 may be made from materials having a relatively low magnetic reluctance such as ferromagnetic materials. Field shell 68 may include two components 72, 74. Component 72 may define a radially extending end wall 76 an axially extending, radially inner wall 78 that extends from end wall 76 towards armature plate 18. Wall 78 may define one or more closed bores 80 configured to receive one end of each spring 20. Component 74 is disposed radially outwardly of wall 78 of component 72. Component 74 may define a radially extending wall 82 that is axially spaced from wall 76 of component 72 and an axially extending, radially outer wall 84 that extends from end wall 82 towards armature plate 18. Outer wall 84 may also define one or more closed bores 86 configured to receive fasteners 36. Walls 76, 82 are axially spaced and sized to receive magnet 70 therebetween. Walls 78, 84 are radially spaced and sized to receive conductor 24 therebetween.

Magnets 70 are provided to establish a magnetic circuit between armature plate 18, field shell 68 and magnets 70 in order to urge armature plate 18 in an axial direction away from friction plate 14 and pressure plate 16 and towards field shell 68 to release brake 66. Magnets 70 may comprise neodymium iron boron (Nd—Fe—B) magnets or other known permanent magnets. Magnets 70 may be disposed axially between walls 76, 82 of components 72, 74 of field shell 68 and may be secure therein using an adhesive. Magnets 70 may be equally circumferentially spaced from one another about the circumferential extent of brake 66.

Unlike brake 10, brake 66 is a bi-stable brake in which supplying a short duration current to conductor 24 causes the brake 66 to move between an engaged and disengaged state and to remain in that state until current is supplied to conductor 24 again. If, for example, brake 66 is engaged with armature plate 18 engaging friction plate 14 under the force exerted by springs 20, current of a first polarity may be provided to conductor 24 to increase the force of the magnetic circuit comprising armature plate 18, field shell 68 and magnets 70 and cause armature plate 18 to move away from friction plate 14 towards field shell 68 and engage field shell 68 to release brake 66. Thereafter, the current supply can be interrupted and armature plate 18 will remain engaged with field shell 68 under the force exerted by the magnetic circuit. Current of an opposite polarity may then be provided to conductor 24 when it is desired to reapply brake 66. The current weakens the magnetic attraction of the magnetic circuit and allows springs 20 to urge armature plate 18 away from field shell 68 towards friction plate 14 to engage brake 66.

In accordance with the present teachings, a reed switch 26 is again provided to indicate an operating state of brake 66. Switch 26 extends across an air gap between members of the magnetic circuit. In the illustrated embodiment, switch 26 is disposed radially outwardly of components 72, 74 of field shell 68 and extends across the air gap between components 72, 74. In the illustrated embodiment, switch 26 detects flux leakage from the magnetic circuit comprising armature plate 18, field shell 68 and magnets 70. In particular, when the brake is engaged and armature plate 18 is spaced from field shell 68, the magnetic flux leakage between components 72, 74 is greater than when the brake is disengaged and armature plate 18 is engaged with field shell 68. Each time brake 66 moves between engaged and disengaged states, movement of armature plate 18 causes a shift in the magnetic reluctance across the air gap between components 72, 74 that results in a change in state of switch 26. When brake 66 is engaged, switch 26 assumes a closed state indicating that the armature plate 18 is disengaged from field shell 68 and engaging friction plate 14 and brake 66 is engaged. When brake 66 is disengaged, switch 26 assumes an open state indicating that the armature plate 18 is engaged with field shell 68 and brake 66 is disengaged.

Referring to FIG. 3, in accordance with the present teachings, switch 26 is again oriented such that a longitudinal axis 54 of switch 26 extends in a direction other than parallel to axis 28 of brake 66. The longitudinal axis 54 of switch 26 will also intersect a plane containing axis 28 (the plane lying perpendicular to the drawing) at an angle θ between zero and ninety degrees. The preferred angle in a given application will depend on several factors including the size of brake 66, available mounting envelope for switch 26, anticipated vibration, the number of turns in a coil conductor 24 and current level, the operating environment for brake 66 (including nearby electromagnetic or magnetic devices and ferromagnetic structures) and the brake's magnetic iron circuit relative to electromagnet flux imbalance. As a result of its orientation, axis 54 also extends in a direction other than parallel to a direction of magnetic force at a point in the air gap where the magnetic force is greatest. Referring to FIG. 4, the magnetic force between components 72, 74 of field shell 68 will be greatest along the shortest path between components 72, 74 which is parallel to axis 28.

Orienting switch 26 such that its longitudinal axis 54 is at an angle relative to the axis 28 again enables more robust and reliable switching. In particular, the orientation again reduces the sensitivity of switch 26 such that switch 26 only closes when there is a relatively high level of flux leakage proximate the air gap between components 72, 74 of field shell 68. As a result, switch 26 only closes when current is supplied to conductor 24, but armature plate 18 improperly fails to disengage from friction plate 14—resulting in a relatively high level of flux leakage across the relatively large air gap between components 72, 74. In this manner, switch 26 is able to indicate an improper operating condition of brake 66 while not generating false positives. The orientation of switch 26 also allows unwanted and inherent residual magnetism to drain from switch 26 to field shell 68 and other ferromagnetic components of the brake 66 when current is not being supplied to conductor 24 thereby preventing the contacts of switch 26 from inadvertently sticking and remaining closed. Further, the orientation of switch 26 accomplishes these results while allowing the switch 26 to be mounted close to the radially outer surface of field shell 68 and brake 66 in general thereby reducing the space required for switch 26 and the packaging of brake 66 while providing protection for switch 26.

A brake 10 or 66 in accordance with the present teachings is advantageous relative to conventional brakes because it provides an effective, low cost indication of the operation of the brake. As a result, a user of the brake and/or the system in which the brake is installed is capable of readily identifying a malfunction of the brake without a significant expenditure of time.

While the invention has been shown and described with reference to one or more particular embodiments thereof, it will be understood by those of skill in the art that various changes and modifications can be made without departing from the spirit and scope of the invention.

What is claimed is:

1. A brake, comprising:
   a friction plate configured for coupling to a shaft for rotation with said shaft about an axis of rotation;
   a pressure plate disposed about said axis on a first side of said friction plate and fixed against rotation;
   an armature plate disposed about said axis on a second side of said friction plate;
   a field shell disposed about said axis on an opposite side of said armature plate relative to said friction plate;
   a spring biasing said armature plate in a first axial direction towards said friction plate and away from said field shell to engage said brake;
   a conductor disposed within said field shell, current supplied to said conductor creating an electromagnetic circuit including said armature plate and said field shell, said electromagnetic circuit urging said armature plate in a second axial direction away from said friction plate and towards said field shell to disengage said brake; and, a reed switch extending across an air gap between said armature plate and said field shell, a state of said reed switch indicative of an operating condition of said brake;

wherein a longitudinal axis of said reed switch extends in a direction other than parallel to said axis of rotation wherein said reed switch assumes a first state when current is not supplied to said conductor and said armature plate is engaged with said friction plate and assumes said first state when current is supplied to said conductor and said armature is engaged with said field shell.

2. The brake of claim 1 wherein said reed switch is disposed radially outwardly of said armature plate and said field shell.

3. The brake of claim 1 wherein said pressure plate is coupled to said field shell.

4. The brake of claim 1 wherein said spring is disposed between said field shell and said armature plate.

5. The brake of claim 1 wherein said longitudinal axis of said reed switch intercepts a plane containing said axis of rotation at an angle greater than zero degrees and less than ninety degrees.

6. The brake of claim 1 wherein said longitudinal axis of said reed switch extends in a direction other than parallel to a direction of a magnetic force at a point in said air gap where said magnetic force is greatest.

7. The brake of claim 1 wherein said reed switch assumes a second state when current is supplied to said conductor and said armature is engaged with said friction plate.

8. The brake of claim 1, further comprising:
a housing, the housing mounting the reed switch therein and defining a mounting flange; and,
a fastener coupling the housing to the brake and extending through the mounting flange.

9. A brake, comprising:
a friction plate configured for coupling to a shaft for rotation with said shaft about an axis of rotation;
a pressure plate disposed about said axis on a first side of said friction plate and fixed against rotation;
an armature plate disposed about said axis on a second side of said friction plate;
a field shell disposed about said axis on an opposite side of said armature plate relative to said friction plate, said field shell including first and second components;
a spring biasing said armature plate in a first axial direction towards said friction plate and away from said field shell to engage said brake;
a permanent magnet disposed between said first and second components of said field shell and forming a magnetic circuit with said first and second components of said field shell and said armature plate
a conductor disposed within said field shell, current of a first polarity supplied to said conductor increasing a force of the magnetic circuit and urging said armature plate in a second axial direction away from said friction plate and towards said field shell to disengage said brake, current of a second polarity supplied to said conductor weakening the force of the magnetic circuit and allowing the spring to move said armature plate in said first axial direction; and, a reed switch extending across an air gap between said first and second components of said field shell, a state of said reed switch indicative of an operating condition of said brake;
wherein a longitudinal axis of said reed switch extends in a direction other than parallel to said axis of rotation.

10. The brake of claim 9 wherein said reed switch assumes a first state when said brake is engaged and a second state when said brake is disengaged.

11. The brake of claim 9 wherein said reed switch is disposed radially outwardly of said first and second components of said field shell.

12. The brake of claim 9 wherein said pressure plate is coupled to said field shell.

13. The brake of claim 9 wherein said spring is disposed between said field shell and said armature plate.

14. The brake of claim 9 wherein said longitudinal axis of said reed switch intercepts a plane containing said axis of rotation at an angle greater than zero degrees and less than ninety degrees.

15. The brake of claim 9 wherein said longitudinal axis of said reed switch extends in a direction other than parallel to a direction of a magnetic force at a point in said air gap where said magnetic force is greatest.

16. The brake of claim 9 wherein said state of said reed switch changes in response to flux leakage at said air gap when said armature plate is spaced from said field shell.

17. A brake, comprising:
a friction plate configured for coupling to a shaft for rotation with said shaft about an axis of rotation;
a pressure plate disposed about said axis on a first side of said friction plate and fixed against rotation;
an armature plate disposed about said axis on a second side of said friction plate;
a field shell disposed about said axis on an opposite side of said armature plate relative to said friction plate;
a spring biasing said armature plate in a first axial direction towards said friction plate and away from said field shell to engage said brake;
a conductor disposed within said field shell, current supplied to said conductor creating an electromagnetic circuit including said armature plate and said field shell, said electromagnetic circuit urging said armature plate in a second axial direction away from said friction plate and towards said field shell to disengage said brake; and,
a reed switch extending across an air gap between said armature plate and said field shell, a state of said reed switch indicative of an operating condition of said brake;
wherein said reed switch assumes a first state when current is not supplied to said conductor and said armature plate is engaged with said friction plate and assumes said first state when current is supplied to said conductor and said armature is engaged with said field shell.

18. The brake of claim 17 wherein said reed switch is adjacent to said air gap and configured to detect flux leakage at said air gap.

19. The brake of claim 17 wherein said reed switch assumes a second state when current is supplied to said conductor and said armature is engaged with said friction plate.

* * * * *